(12) United States Patent
Morenko et al.

(10) Patent No.: US 10,927,764 B2
(45) Date of Patent: Feb. 23, 2021

(54) FUEL MANIFOLD ASSEMBLY

(71) Applicant: PRATT & WHITNEY CANADA CORP., Longueuil (CA)

(72) Inventors: Oleg Morenko, Oakville (CA); Ryan Miskie, Guelph (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 141 days.

(21) Appl. No.: 16/142,189

(22) Filed: Sep. 26, 2018

(65) Prior Publication Data

US 2020/0095935 A1 Mar. 26, 2020

(51) Int. Cl.
*F02C 7/22* (2006.01)
*F23R 3/28* (2006.01)

(52) U.S. Cl.
CPC ............. *F02C 7/222* (2013.01); *F23R 3/28* (2013.01)

(58) Field of Classification Search
CPC ........... F02C 7/222; F02C 7/228; F02C 7/232
See application file for complete search history.

(56) References Cited

U.S. PATENT DOCUMENTS

| | | | | |
|---|---|---|---|---|
| 4,028,888 A * | 6/1977 | Pilarczyk | ............. | F02C 7/222 60/798 |
| 5,168,698 A * | 12/1992 | Peterson | ............. | F02C 7/222 60/739 |
| 5,211,005 A * | 5/1993 | Hovnanian | ............. | F02C 7/22 60/739 |
| 5,598,696 A * | 2/1997 | Stotts | ............. | F02C 7/22 60/740 |
| 6,755,024 B1 * | 6/2004 | Mao | ............. | F23D 11/107 239/416 |
| 7,854,120 B2 * | 12/2010 | Olver | ............. | F02C 7/222 60/739 |
| 8,037,690 B2 * | 10/2011 | Morenko | ............. | F02C 7/222 60/739 |
| 9,360,219 B2 * | 6/2016 | Roesler | ............. | F23R 3/28 |
| 9,797,313 B2 * | 10/2017 | Morenko | ............. | F02C 7/222 |
| 9,879,606 B2 | 1/2018 | Morenko et al. | | |
| 10,132,244 B2 * | 11/2018 | Chasse, Jr. | ............. | F23R 3/28 |
| 10,184,403 B2 * | 1/2019 | McCaldon | ............. | F23R 3/12 |
| 10,823,073 B2 * | 11/2020 | Morenko | ............. | F02C 7/222 |
| 2005/0188699 A1 * | 9/2005 | Shafique | ............. | F02C 7/222 60/739 |
| 2006/0156733 A1 * | 7/2006 | Prociw | ............. | F02C 7/222 60/776 |
| 2007/0044765 A1 * | 3/2007 | Lincourt | ............. | F02C 7/222 123/466 |
| 2007/0204622 A1 * | 9/2007 | Patel | ............. | B23B 1/00 60/772 |
| 2007/0234724 A1 * | 10/2007 | Prociw | ............. | F02C 7/222 60/740 |

(Continued)

*Primary Examiner* — William H Rodriguez
(74) *Attorney, Agent, or Firm* — Norton Rose Fulbright Canada LLP

(57) ABSTRACT

The gas turbine engine fuel manifold assembly includes a fuel manifold, and fuel nozzles secured to the fuel manifold and in fluid communication therewith. A fuel inlet connector has a body secured to the fuel manifold, and is in-line therewith. The fuel inlet connector has at least one connector outlet fluidly connected to the fuel manifold. The at least one connector outlet defines a fuel flow direction having a main component in a circumferential direction relative to the axis.

19 Claims, 2 Drawing Sheets

(56) References Cited

U.S. PATENT DOCUMENTS

| | | | |
|---|---|---|---|
| 2008/0016869 A1* | 1/2008 | Fish | F02C 7/222 60/739 |
| 2008/0072598 A1* | 3/2008 | Fish | F02C 7/222 60/734 |
| 2008/0083225 A1* | 4/2008 | Fish | F02C 7/222 60/772 |
| 2009/0072051 A1* | 3/2009 | Fish | F02C 7/222 239/392 |
| 2010/0077758 A1* | 4/2010 | Rudrapatna | F02C 7/222 60/739 |
| 2010/0146928 A1* | 6/2010 | Morenko | F02C 7/222 60/39.094 |
| 2018/0156126 A1* | 6/2018 | Snyder | F02C 7/228 |
| 2018/0283285 A1* | 10/2018 | Cheung | F02C 7/222 |
| 2019/0234310 A1* | 8/2019 | Morenko | F01D 25/24 |
| 2019/0234311 A1* | 8/2019 | Morenko | F02C 7/222 |

\* cited by examiner

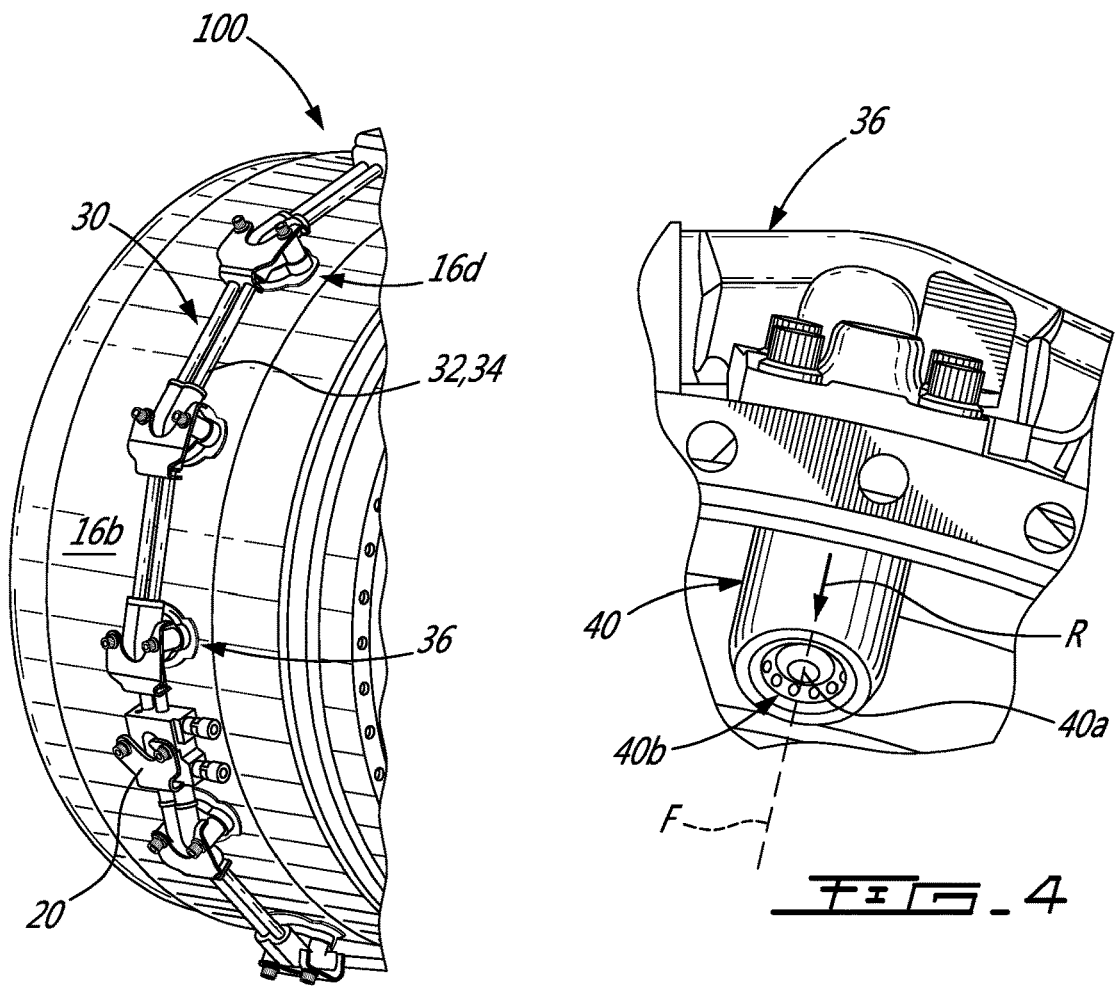
FIG. 2
FIG. 4
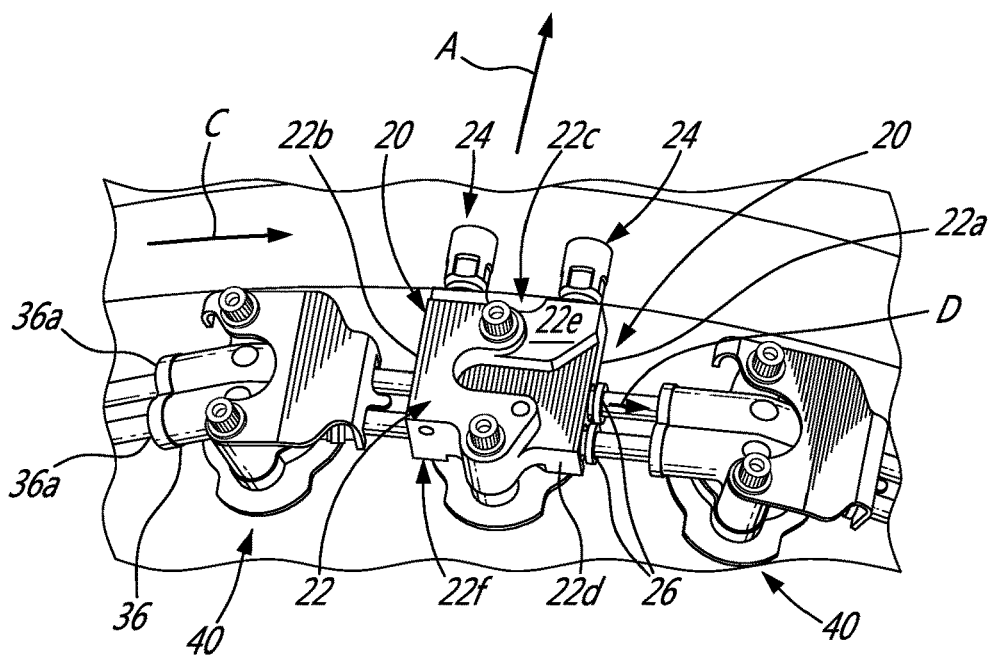
FIG. 3

FUEL MANIFOLD ASSEMBLY

TECHNICAL FIELD

The application relates generally to gas turbine engines and, more particularly, to systems and methods for feeding fuel to combustors of such engines.

BACKGROUND

Fuel manifolds are fluidly connected to a source of fuel, such as a fuel tank, and are used to distribute the fuel to a plurality of locations. For a gas turbine engine, the fuel manifold typically circumferentially extends around a combustor of the gas turbine engine to distribute the fuel to a plurality of fuel nozzles disposed at circumferentially spaced apart locations. The fuel nozzles are fluidly connected to the fuel manifold to inject the fuel from the fuel manifold into the combustion chamber at the plurality of circumferential locations. Typically, fuel is fed into a primary one of these fuel nozzles, before being distributed circumferentially through the manifold to the other fuel nozzles. Such a primary fuel nozzle therefore includes means for being fluidly connected to the source of fuel, and thus differs from the other fuel nozzles in construction and operation.

SUMMARY

There is accordingly provided a fuel manifold assembly for a gas turbine engine comprising: a fuel manifold circumferentially extending around an axis and configured for circulating fuel therethrough; fuel nozzles circumferentially distributed around the axis, the fuel nozzles in fluid communication with the fuel manifold for receiving the fuel therefrom, the fuel nozzles having nozzle outlets adapted to inject fuel into a combustion chamber of the gas turbine engine; a fuel inlet connector having a body secured to the fuel manifold between two circumferentially adjacent ones of the fuel nozzles, the fuel inlet connector having a connector inlet configured to be fluidly connected to a source of fuel for receiving the fuel from said source, the fuel inlet connector having at least one connector outlet defined by the body and fluidly connected to the fuel manifold, the at least one connector outlet defining a fuel flow direction having a main component in a circumferential direction relative to the axis.

There is also provided a gas turbine engine comprising: a combustor that is annular and that circumferentially extends around a central axis of the gas turbine engine, the combustor having an inner liner and an outer liner defining a combustion chamber therebetween; a fuel manifold external to the combustor; fuel nozzles circumferentially distributed around the central axis and secured to the fuel manifold, the fuel nozzles extending into the combustion chamber and fluidly connected to the fuel manifold, the fuel nozzles having nozzle outlets located in the combustion chamber for injecting fuel into the combustion chamber; a fuel inlet connector having a body secured to the fuel manifold and being external to the combustion chamber, the body located between two circumferentially adjacent ones of the fuel nozzles, the fuel inlet connector having a connector inlet fluidly connected to a source of fuel and having at least one connector outlet defined by the body and fluidly connected to the fuel manifold, the at least one connector outlet defining a fuel flow direction having a main component in a circumferential direction relative to the axis.

There is further provided a method of operating a fuel manifold assembly of a gas turbine engine having a central axis, the method comprising: receiving fuel from a fuel source into a fuel inlet connector disposed at a first circumferential location; distributing the fuel from the fuel inlet connector in a fuel flow direction having a main component along a circumferential direction relative to the central axis; and injecting the fuel into a combustion chamber of the gas turbine engine at a plurality of circumferential locations different than the first circumferential location of the fuel inlet connector.

BRIEF DESCRIPTION OF THE DRAWINGS

Reference is now made to the accompanying figures in which:

FIG. 2 is a three-dimensional view of a fuel manifold assembly in accordance with a particular embodiment;

FIG. 3 is a three-dimensional view of a portion of the fuel manifold assembly of FIG. 2; and FIG. 4 is a partial front view of a fuel nozzle of the fuel manifold assembly of FIG. 2.

DETAILED DESCRIPTION

Figure 1:
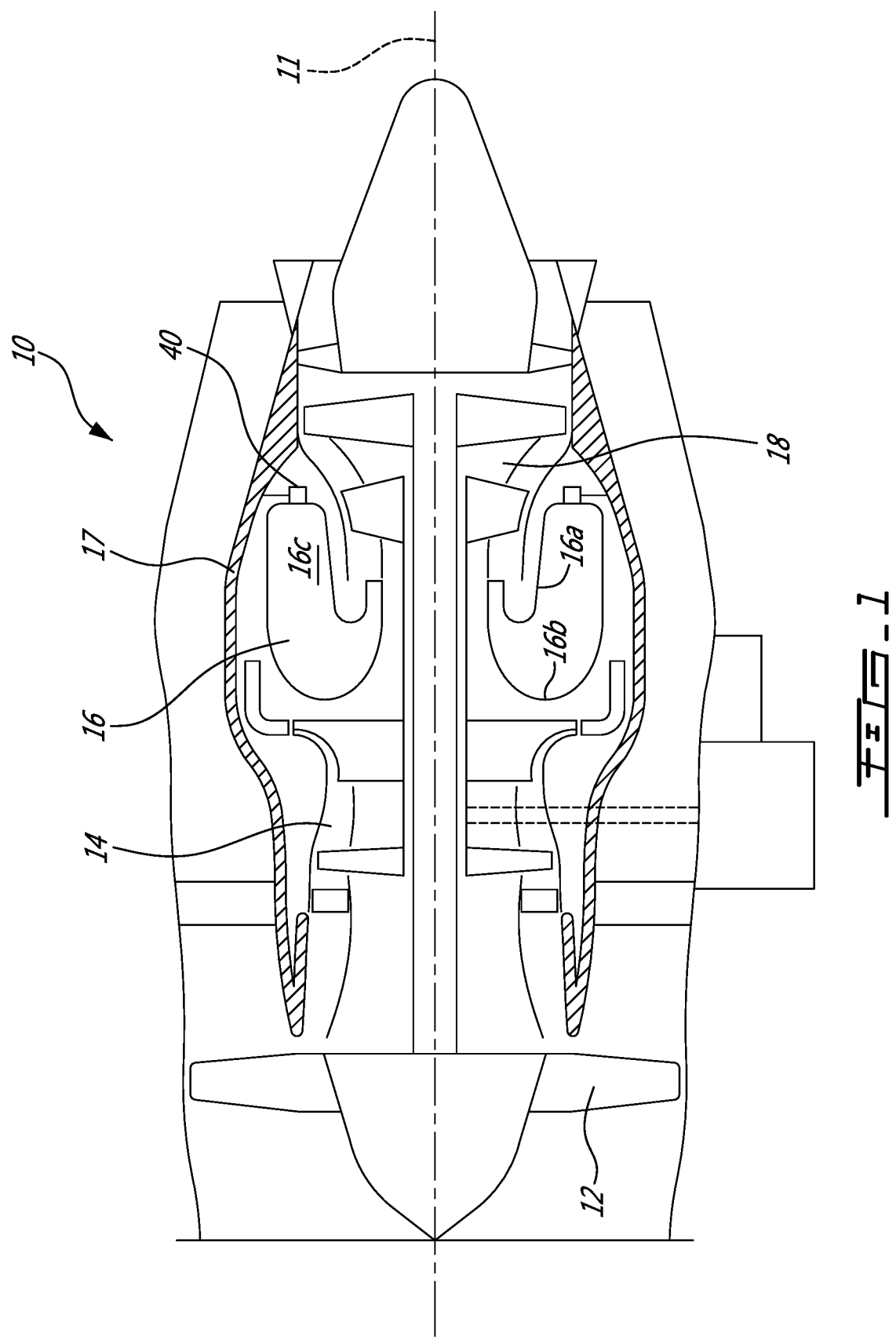
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

The combustor 16 extends circumferentially a full circumference around the central axis 11. As shown in FIG. 1, the combustor includes an inner liner 16a and an outer liner 16b located radially outwardly to the inner liner 16a relative to the central axis 11. A combustion chamber 16c is located between the inner liner 16a and the outer liner 16b. The outer liner 16b of the combustor 16 defines apertures 16d (FIG. 2) for receiving therein fuel nozzles 40 (FIG. 4). The combustor 16 is disposed within a surrounding combustor case 17 of the gas turbine engine 10.

Referring to FIGS. 1-2, the gas turbine engine 10 includes a fuel manifold assembly 100 for distributing fuel from a source of fuel (e.g., fuel tank) to the fuel nozzles 40. The fuel manifold assembly 100 includes a fuel manifold 30 located outside, and being external to, the combustor case 17. In the embodiment shown, the fuel manifold 30 is located radially outwardly to the combustor case 17 relative to the central axis 11. The fuel manifold assembly 100 further includes the fuel nozzles 40 and a fuel inlet connector 20. The fuel inlet connector 20 is external to the combustor case 17. The fuel inlet connector 20 is fluidly connected to the fuel manifold 30 and is used for distributing the fuel from the source of fuel to the fuel manifold 30 and to the combustion chamber 16c via the fuel nozzles 40. The fuel inlet connector 20 may include a flow divider and/or a flow control unit for distributing the fuel amongst its outlets. More details about the configuration of the fuel inlet connector 20 are presented below.

The different components of the fuel manifold assembly 100 are described herein below in an upstream to downstream order, that is, from the source of fuel to the combustion chamber 16c.

Referring now to FIG. 3, the fuel inlet connector 20 has a body 22 that is secured to the fuel manifold 30 and that may be secured to the combustor case 17. The fuel inlet connector 20 may be secured to the combustor 16 with fasteners or any other suitable mean.

The body 22 of the fuel inlet connector 20 is circumferentially located between two adjacent ones of the fuel nozzles 40, and may also be axially aligned with the fuel nozzles 40. In one particular embodiment, the body 22 of the fuel inlet connector 20 has two lateral sides, namely a first lateral side 22a and a second lateral side 22b, a front side 22c, and a rear side 22d. It is however to be understood that the body 22 can alternately be rotated by 180 degrees, in which case the front and rear sides 22c and 22d are switched. The first and second lateral sides 22a, 22b are oriented in a circumferential direction C relative to the central axis 11 whereas the front and rear sides 22c, 22d are oriented in an axial direction A relative to the axis 11. The first and second lateral sides 22a, 22b both extend from the front side 22c to the rear side 22d. The body 22 further has a top side 22e and a bottom side 22f opposed to the top side 22e. All of the first lateral side 22a, the second lateral side 22b, the front side 22c, and the rear side 22d extend from the top side 22e to the bottom side 22f. Other shapes for the body 22 of the fuel inlet connector 20 are contemplated.

The body 22 defines two connector inlets 24 that are located on the front side 22c of the body 22 in the embodiment shown, but may alternatively be defined on any other sides of the body without departing from the scope of the present disclosure. In the depicted embodiment, the two connector inlets 24 are each fluidly connected to the source of fuel. Each of the two connector inlets 24 may be connected to a respective one of two sources of fuels (e.g., two fuel tanks). It is understood that the fuel inlet connector 20 may include only one connector inlet 24 or more than two.

In the depicted embodiment, the fuel inlet connector 20 has four connector outlets 26, two on each of the first and second lateral sides 22a, 22b. As illustrated in FIG. 3, all of the connector outlets 26 of the fuel inlet connector 20 are fluidly connected to the fuel manifold 30. In the embodiment shown, each of the two connector inlets 24 is fluidly connected to a respective one of the two connector outlets 26 on the first lateral side 22a of the body 22 and to a respective one of the remaining two connector outlets 26 on the second lateral side 22b of the body 22. Other configurations are contemplated without departing from the scope of the present disclosure. As discussed below, the connector outlets 26 direct the fuel received via the connector inlets 24 to the fuel manifold 30.

As illustrated in FIG. 3, the body 22 of the fuel inlet connector 20 is in-line with the fuel manifold 30. Stated otherwise, each of the four connector outlets 26 defines a fuel flow direction D that has a main component that is in the circumferential direction C relative to the central axis 11. In the embodiment shown, the fuel flow direction D is free of a radial component and/or of an axial component relative to the central axis 11. The fuel flow directions D of the two of the four connector outlets 26, which are located on the first lateral side 22a, and of the remaining two of the four connector outlets 26, which are located on the second lateral side 22b, are oriented away from each other. In other words, although the fuel flow direction D of each of the four connector outlets 26 has a main component in the circumferential direction C, the fuel flow direction D of the two of the four connector outlets 26 is oriented in a clockwise orientation whereas the fuel flow direction of the remaining two of the four connector outlets 26 is oriented in a counterclockwise orientation.

Referring now to FIGS. 2-3, the fuel manifold 30 is described. The fuel manifold 30 includes two fuel lines 32, or rings, each of which circumferentially extends around the central axis 11. More specifically, each of the two fuel lines 32 extends from the first lateral side 22a of the body 22 to the second lateral side 22b of the body 22 and around the combustion chamber 16c. It is understood that the fuel manifold 30 may include only one fuel line 32 or more than two fuel lines without departing from the scope of the present disclosure. Each of the two fuel lines 32 is fluidly connected to a respective one of the two connector outlets 26 on the first lateral side 22a of the body 22 and to a respective one of the remaining two connector outlets 26 on the second lateral side 22b of the body 22. In a particular embodiment, the fuel manifold 30 may include only one fuel line; said fuel line may be fluidly connected to the fuel inlet connector 20 solely via a single connector outlet. That is, the fuel manifold 30 need not be fluidly connected at two locations to the fuel inlet connector 20.

Referring now to FIGS. 2-4, each of the two fuel lines 32 includes conduits 34 and nozzle connectors 36; each of the conduits 34 being fluidly connected to two adjacent ones of the nozzle connectors 36. The nozzle connectors 36 may be secured to the combustor case 17 with fasteners or any other suitable mean. Each of the two fuel lines 32 includes a respective one of two sets of the conduits 34 and all of the nozzle connectors 36. The conduits 34 may be hoses made of flexible or rigid material. Any suitable material known in the art may be used for the conduits 34. The nozzle connectors 36 may be secured to the combustor case 17.

One of the nozzle connectors 36 is described herein below using the singular form for the sake of clarity. Accordingly, the below description may be applied to all of the nozzle connectors 36. The nozzle connector 36 is securable to the combustor case 17. The nozzle connector 36 defines two outlets that are oriented in a radial direction R relative to the central axis 11, and that are fluidly connected to the fuel nozzles 40, and four inlets 36a that are oriented in the circumferential direction C relative to the central axis 11. Two of the four inlets 36a are located on a first lateral side of the nozzle connector 36 whereas the remaining two of the four inlets 36a are located on a second lateral side of the nozzle connector 36 opposed to the first lateral side. Each of the four inlets 36a is configured to sealingly engage a conduit 34 for circulating the fuel therethrough.

In the embodiment shown, one of the inlets 36a on the first lateral side of the nozzle connector 36 and one of the inlets 36a on the second lateral side of the nozzle connector 36 are fluidly connected to one of the two connector inlets 24 of the fuel inlet connector 20. The other of the inlets 36a on the first lateral side of the nozzle connector 36 and the other of the inlets 36a on the second lateral side of the nozzle connector 36 are fluidly connected to the other of the two connector inlets 24 of the fuel inlet connector 20. In the embodiment shown, one of the two connector inlets 24 of the fuel inlet connector 20 is fluidly connected to one of the two outlets of the nozzle connector 36 and the other of the two connector inlets 24 of the fuel inlet connector 20 is fluidly connected to the other of the two outlets of the nozzle connector 36.

Referring more particularly to FIG. 4, the fuel nozzles 40 will now be described. At least injecting tips of the fuel nozzles 40 extend into the combustion chamber 16c. One of the fuel nozzles 40 is described herein below using the singular form for the sake of clarity. Accordingly, the below description may be applied to all of the fuel nozzles.

The fuel nozzle 40 includes two nozzle inlets each fluidly connected to a respective one of the two outlets of the nozzle connectors 36. The fuel nozzle 40 includes two nozzle outlets 40a, 40b each fluidly connected to the combustion chamber 16c. In the embodiment shown, the fuel nozzle 40 extends substantially radially relative to the central axis 11 and is located inside the combustion chamber 16c such that the fuel exits the two nozzle outlets 40a, 40b of the fuel nozzles 40 in the combustion chamber 16c. In the depicted embodiment, the fuel nozzle assembly 100 is free of other kind of fuel nozzles 40.

In the depicted embodiment, a first one 40a of the two nozzle outlets 40a, 40b defines an exit flow axis F and is configured to output fuel along the exit flow axis F. A second one 40b of the two nozzle outlets 40a, 40b is provided in an annular form and circumferentially extends around the exit flow axis F of the first one 40a of the two nozzle outlets. The second one 40b of the two nozzle outlets is configured to output an annular stream of fuel around the exit flow axis F. Other configurations are contemplated without departing from the scope of the present disclosure. The fuel nozzles 40 and the nozzle connectors 36 are secured to one another and may be monolithic. The fuel nozzles 40 may have each a single nozzle outlet without departing from the scope of the present disclosure.

In the embodiment shown, the nozzle outlets 40a, 40b are fluidly connected to the source of fuel solely via the fuel inlet connector 20. In the depicted embodiment, the fuel inlet connector 20 is fluidly connected to the combustion chamber 16c solely via the fuel manifold 30, and the fuel inlet connector 20 is free of direct connection with a fuel nozzle.

In the embodiment shown, a radial position of the inlets 36a of the nozzle connectors 36 relative to the central axis 11 corresponds to a radial position of the connector outlets 26 of the fuel inlet connector 20 relative to the central axis 11. In the embodiment shown, an axial position of the inlets 36a of the nozzle connectors 36 relative to the central axis 11 corresponds to an axial position of the connector outlets 26 of the fuel inlet connector 20 relative to the central axis 11. In a particular embodiment, having the radial positions and/or the axial positions of the inlets 36a of the nozzle connectors 36 corresponding to that of the outlets 26 of the fuel inlet connector 20 allows to minimize a distance traveled by the fuel and might allow a reduction of pressure losses within the fuel manifold 30 compared to a configuration that does not present the axial and/or radial alignment of the inlets 36a of the nozzle connectors 36 with the outlets 26 of the fuel inlet connector 20.

Herein, having the inlets 36a of the nozzle connectors 36 being axially and/or radially aligned with the connector outlets 26 of the fuel inlet connector 20 means that a center of flow traversing areas defined by the inlets 36a is axially and/or radially aligned with a center of flow traversing areas defined by the connector outlets 26. In the embodiment shown, the flow traversing areas of both the inlets 36a and the connector outlets 26 are circular surfaces; the centers of the circular surfaces of the inlets 36a being axially and/or radially aligned with that of the circular surfaces of the connector outlets 26. Other shapes (e.g., elliptic, rectangular) for the flow traversing areas may be used without departing from the scope of the present disclosure.

For operating the fuel manifold assembly 100, the fuel is received from the fuel source in a fuel inlet connector 20. The fuel is outputted from the fuel inlet connector 20 in the fuel flow direction D having the main component along the circumferential direction C relative to the central axis 11. The fuel is injected into the combustion chamber 16c of the gas turbine engine 10 at the plurality of circumferential locations different than the circumferential location of the fuel inlet connector 20.

In a particular embodiment, having the fuel inlet connector 20 allows the use of a single design for all of the fuel nozzles 40 instead of having two designs, one of which including an interface for connection with the source of fuel. Having only a single design for the fuel nozzles 40 might allow cost reduction and a decrease in the complexity of the fuel manifold assembly 100 compared to a configuration having a fuel nozzle that includes an interface for connection to the source of fuel.

In a particular embodiment, the fuel inlet connector 20 isolates the fuel manifold 30 from an interface with the source of fuel. Consequently, subsequent modifications to the source of fuel do not require modifying the fuel nozzles 40. The disclosed fuel manifold assembly 100 might be used for different types of fuel manifolds, such as flexible or rigid, as well as different combinations of simplex and duplex nozzles. In a particular embodiment, unlike a configuration requiring two designs of fuel nozzles, the fuel inlet connector allows the removal of any of the fuel nozzles 40 for overhaul without having to disconnect the source of fuel from the fuel inlet connector 20. The fuel inlet connector 20 might allow the flow divider and/or the flow control unit embedded therein to be designed independently of the fuel manifold 30 and the fuel nozzles 40, which may be useful for engine derivatives. By providing the fuel inlet connector 20 "in-line" with the fuel manifold 30, as described herein, the in-line inlet connector 20 may accordingly "seats" within the fuel nozzle/manifold envelope, which can help to reduce the possibility of interference with any surrounding components.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A fuel manifold assembly for a gas turbine engine comprising:
    a fuel manifold circumferentially extending around an axis and configured for circulating fuel therethrough, the fuel manifold including two fuel lines circumferentially extending around the axis;
    fuel nozzles circumferentially distributed around the axis, the fuel nozzles in fluid communication with the fuel manifold for receiving the fuel therefrom, the fuel nozzles having nozzle outlets adapted to inject fuel into a combustion chamber of the gas turbine engine, at least one of the fuel nozzles having two outlets each fluidly connected to a respective one of the two fuel lines;
    a fuel inlet connector having a body secured to the fuel manifold between two circumferentially adjacent ones of the fuel nozzles, the fuel inlet connector is free of direct connection with the fuel nozzles, the fuel inlet connector having a connector inlet connectable to a source of fuel for receiving the fuel from said source, the fuel inlet connector having at least one connector outlet defined by the body and fluidly connected to the fuel manifold, the at least one connector outlet defining a fuel flow direction having a main component in a circumferential direction relative to the axis.

2. The fuel manifold assembly of claim 1, wherein the fuel manifold includes nozzle connectors each secured to and fluidly connected to a respective one of the fuel nozzles, a radial position of the at least one connector outlet relative to the central axis corresponds to that of inlets of the nozzle connectors.

3. The fuel manifold assembly of claim 1, wherein the fuel manifold includes nozzle connectors each secured to and fluidly connected to a respective one of the fuel nozzles, an axial position of the at least one connector outlet relative to the central axis corresponds to that of inlets of the nozzle connectors.

4. The fuel manifold assembly of claim 1, wherein the at least one connector outlet includes at least two connector outlets, one of the at least two connector outlets located on a first lateral side of the body, another one of the at least two connector outlets located on a second lateral side of the body opposed to the first lateral side, the fuel manifold fluidly connected to both of the at least two connector outlets.

5. The fuel manifold assembly of claim 1, wherein the fuel manifold includes nozzle connectors and conduits, each of the conduits fluidly connected to two adjacent ones of the nozzle connectors, each of the nozzle connectors secured to, and fluidly connected to, a respective one of the fuel nozzles.

6. The fuel manifold assembly of claim 1, wherein each of the fuel nozzles includes two outlets each fluidly connected to a respective one of the two fuel lines.

7. The fuel manifold assembly of claim 1, wherein the fuel inlet connector has two connector inlets defined by the body, each of the fuel nozzles includes two outlets, each of the two connector inlets fluidly connected to a respective one of the two outlets of the fuel nozzles via the fuel manifold.

8. The fuel manifold assembly of claim 1, wherein the fuel flow direction is free of a radial component relative to the axis.

9. The fuel manifold assembly of claim 1, wherein the fuel flow direction is free of an axial component relative to the axis.

10. A gas turbine engine comprising: a combustor that is annular and that circumferentially extends around a central axis of the gas turbine engine, the combustor having an inner liner and an outer liner defining a combustion chamber therebetween; a fuel manifold external to the combustor; fuel nozzles circumferentially distributed around the central axis and secured to the fuel manifold, the fuel nozzles extending into the combustion chamber and fluidly connected to the fuel manifold, at least one of the fuel nozzles having two nozzle outlets located in the combustion chamber for injecting fuel into the combustion chamber; a fuel inlet connector having a body secured to the fuel manifold and being external to the combustion chamber, the body located between two circumferentially adjacent ones of the fuel nozzles, the fuel inlet connector having two connector inlets defined by the body and fluidly connected to a source of fuel, the fuel inlet connector having at least one connector outlet defined by the body and fluidly connected to the fuel manifold, each of the two connector inlets fluidly connected to a respective one of the two nozzle outlets of the at least one of the fuel nozzles via the fuel manifold, the at least one connector outlet defining a fuel flow direction having a main component in a circumferential direction relative to the axis, each of the nozzle outlets fluidly connected to the connector inlet solely via the fuel manifold.

11. The gas turbine of claim 10, wherein the body of the fuel inlet connector is secured to a combustor case of the gas turbine engine.

12. The gas turbine engine of claim 10, wherein the fuel manifold includes nozzle connectors each secured to and fluidly connected to a respective one of the fuel nozzles, a radial position of the at least one connector outlet relative to the central axis corresponds to that of inlets of the nozzle connectors.

13. The gas turbine engine of claim 10, wherein the fuel manifold includes nozzle connectors each secured to and fluidly connected to a respective one of the fuel nozzles, an axial position of the at least one connector outlet relative to the central axis corresponds to that of inlets of the nozzle connectors.

14. The gas turbine engine of claim 10, wherein the at least one connector outlet includes at least two connector outlets, one of the at least two connector outlets located on a first lateral side of the body, another one of the at least two connector outlets located on a second lateral side of the body opposed to the first lateral side, the fuel manifold fluidly connected to both of the at least two connector outlets.

15. The gas turbine engine of claim 10, wherein the fuel manifold includes nozzle connectors and conduits, each of the conduits fluidly connected to two adjacent ones of the nozzle connectors, each of the nozzle connectors secured to, and fluidly connected to, a respective one of the fuel nozzles.

16. The gas turbine engine of claim 10, wherein the fuel manifold includes two fuel lines circumferentially extending around the axis, each of the fuel nozzles includes two outlets each fluidly connected to a respective one of the two fuel lines.

17. The gas turbine engine of claim 10, wherein each of the fuel nozzles includes two nozzle outlets, each of the two connector inlets fluidly connected to a respective one of the two outlets of the fuel nozzles via the fuel manifold.

18. The gas turbine engine of claim 10, wherein the fuel flow direction is free of a radial component relative to the axis.

19. The gas turbine engine of claim 10, wherein the fuel flow direction is free of an axial component relative to the axis.

* * * * *